United States Patent [19]

Adkins

[11] 4,409,862
[45] Oct. 18, 1983

[54] VARIABLE SPEED ROTARY POWER TRANSMISSION

[76] Inventor: John S. Adkins, 2217 Main St., Santa Monica, Calif. 90405

[21] Appl. No.: 246,278

[22] Filed: Mar. 23, 1981

[51] Int. Cl.³ .............................................. F16H 37/00
[52] U.S. Cl. ........................................ 74/689; 474/53
[58] Field of Search ..................... 74/681, 689; 474/49, 474/53, 54

[56] References Cited

U.S. PATENT DOCUMENTS

| 849,750 | 4/1907 | Rosewarne | 474/53 |
| 896,160 | 8/1908 | Rosewarne | 474/53 X |
| 1,702,627 | 2/1929 | Bronander | 74/689 |
| 2,076,926 | 4/1937 | Timmermann | 74/689 |

FOREIGN PATENT DOCUMENTS

| 879157 | 10/1961 | United Kingdom | 74/689 |
| 1603633 | 11/1981 | United Kingdom | 74/689 |

*Primary Examiner*—Leslie A. Braun
*Assistant Examiner*—Frank H. McKenzie, Jr.
*Attorney, Agent, or Firm*—Fulwider, Patton, Rieber, Lee & Utecht

[57] ABSTRACT

A variable speed rotary power transmission comprises a planetary gear train having a cage with at least one planet gear meshed between a ring gear and a sun gear for orbital motion about an axis common to the ring gear and the sun gear. A driven output is connected to one of the planetary gear train elements and a driving input rotatably drives another of the planetary gear train elements. A variable speed drive assembly varies the relative rotational speed of the remaining planetary gear train element such that the driven output is rotatably driven at a speed which is continuously variable throughout a predetermined speed range without varying the speed of the driving input. In one preferred embodiment, the driving input is connected to the cage and the variable speed drive assembly rotatably drives the ring gear in the same rotational direction as the cage. In this embodiment, the driven output is connected to the sun gear and is driven at a rotational speed which is continuously variable from a speed in one rotational direction through zero to a speed in a second, opposite rotational direction.

9 Claims, 9 Drawing Figures

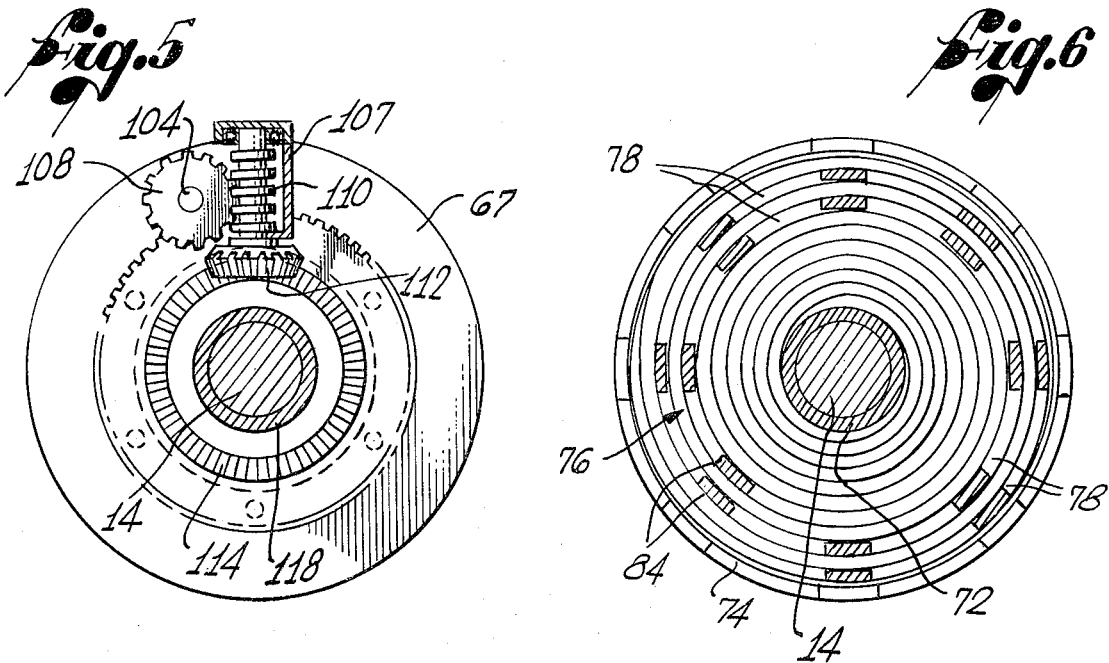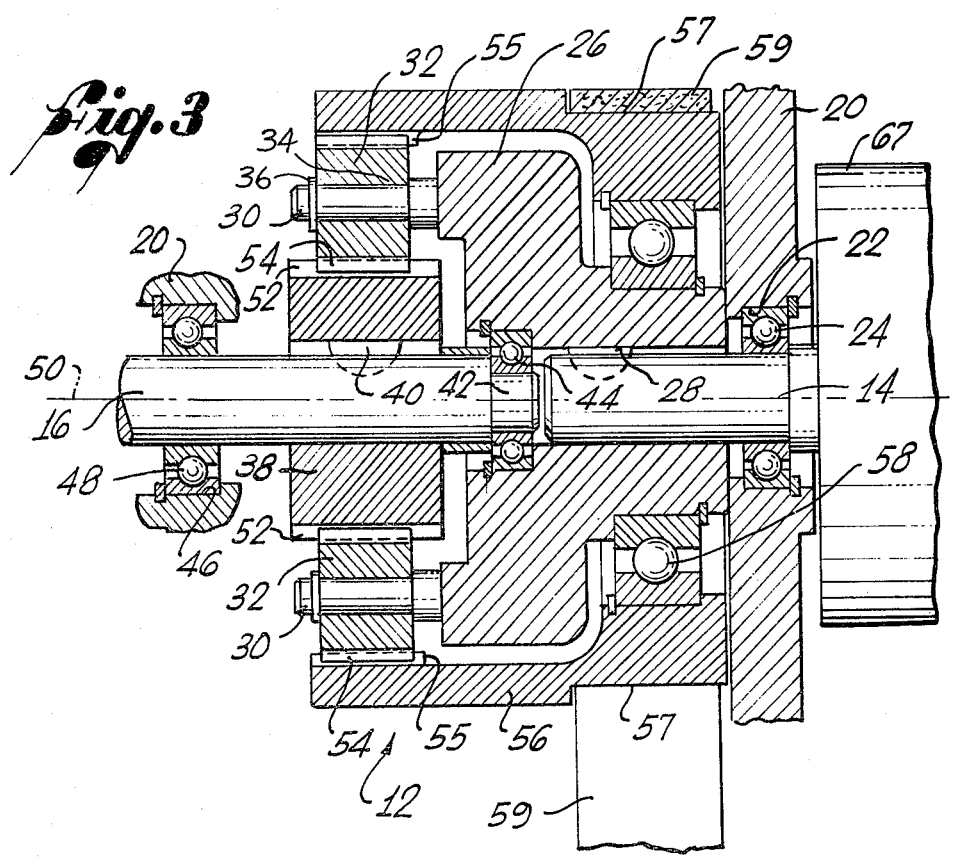

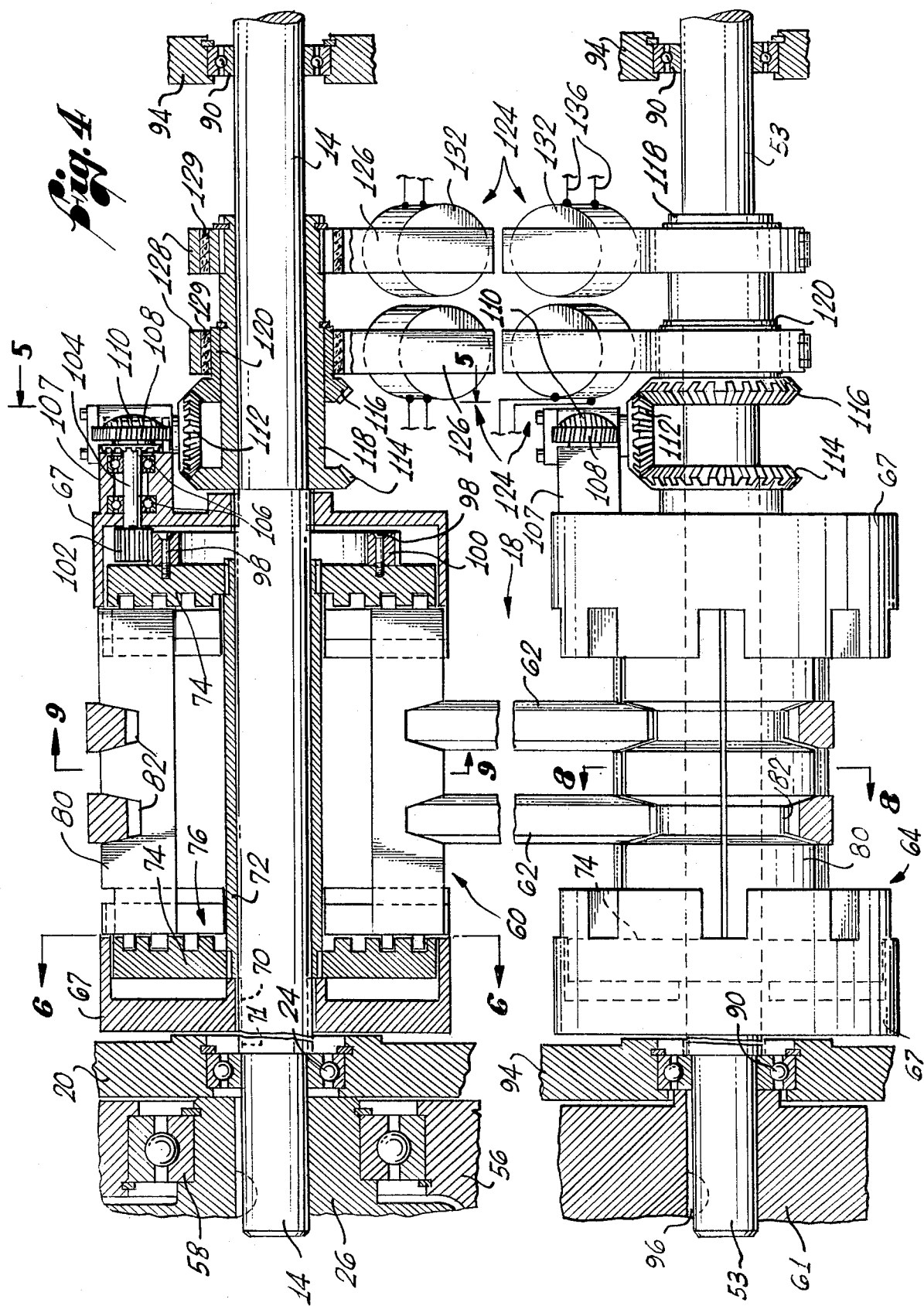

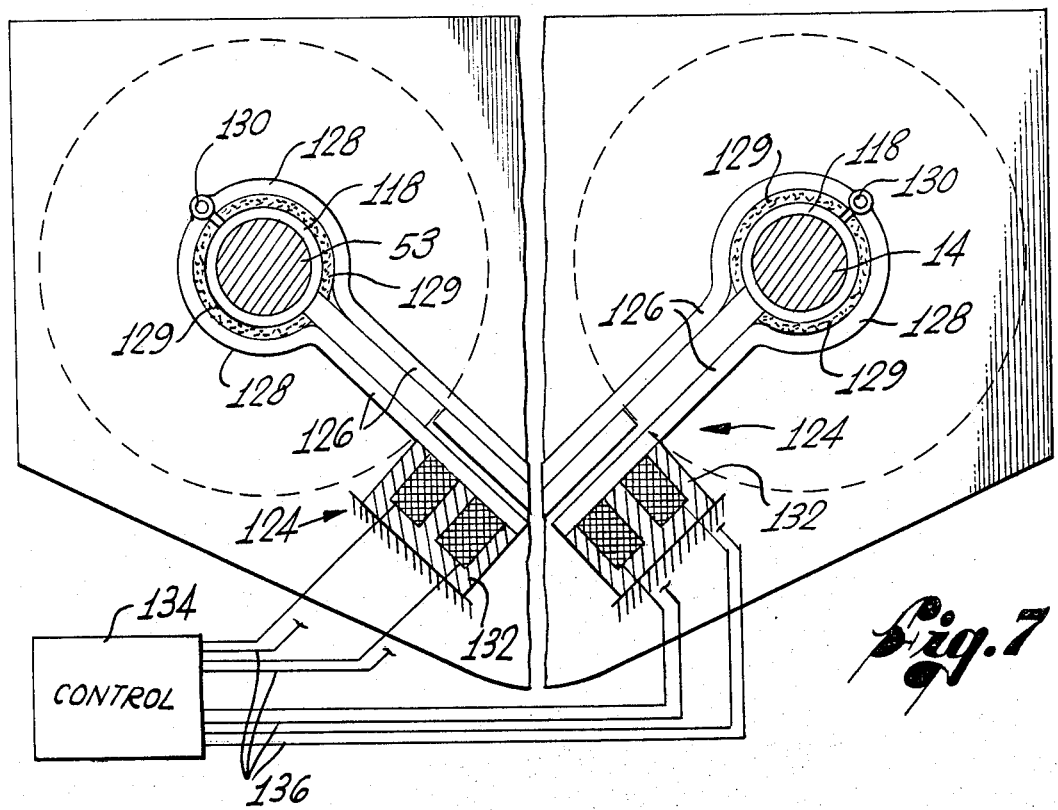
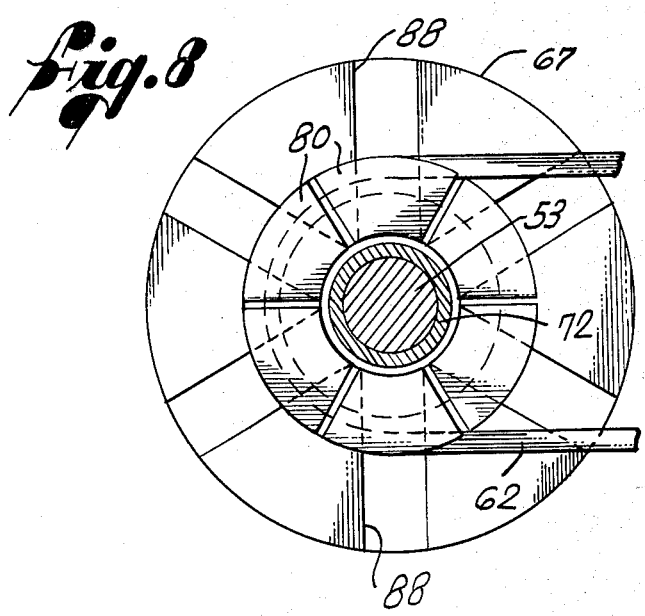
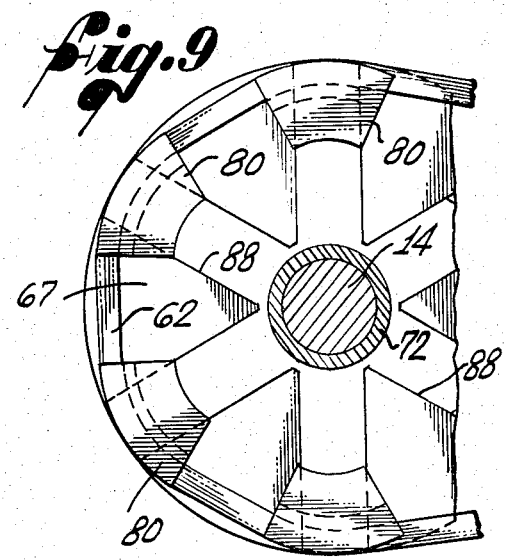

VARIABLE SPEED ROTARY POWER TRANSMISSION

BACKGROUND OF THE INVENTION

This invention relates to rotary power transmissions. More specifically, this invention relates to a rotary power transmission for providing a rotational output having a speed which is continuously variable throughout a prescribed speed range without varying the speed of driving input, and which is capable of providing a reversible rotational output in response to a non-reversing rotational input.

A wide variety of mechanical rotational power transmissions are available throughout the art, and these transmissions typically comprise a plurality of gears meshed together to convert a rotational input to a rotational output of the desired speed. In one common form, these rotary power transmissions include a so-called planetary gear train including a sun gear, a ring gear, and a cage having planet gears meshed between the sun and ring gears. The planetary gear train responds to a rotational input to provide an appropriate speed-adjusted rotational output. Of course, variation in the speed of the driving input correspondingly varies the rotational speed of the driven output.

In many applications of rotary power transmissions, it is highly desirable to reverse the rotational direction of the driven output during at least some conditions of operation. In the prior art, reversal of the output has been achieved by disengaging members of the gear train in order to disconnect the driving input from the driven output, and then by coupling an idler gear into the gear train to reverse the rotational direction of the driven gears. However, this engaging and disengaging of gear train members results in substantial wear of the various gear train components. Moreover, this arrangement requires the use of additional gears and a clutch device for controlling engagement and disengagement of the gear train members, and these additional components are also subject to wear and resulting periodic maintenance.

The present invention overcomes the problems and disadvantages of the prior art by providing an improved rotary power transmission including a plurality of gear train elements and associated control mechanisms arranged for providing a rotational output of continuously variable speed without varying the speed of a rotational input and which can be adapted for reversible operation in response to a non-reversing rotational input without requiring engagement and disengagement of gear train elements.

SUMMARY OF THE INVENTION

In accordance with the invention, a rotary power transmission comprises a planetary gear train having a sun gear, a ring gear, and a cage, all rotatable about a common axis. The cage includes at least one planet gear rotatable about its own axis and meshed between the sun and ring gears for orbital motion about the common axis. A driven output member is connected for rotation by one of the sun gear, the ring gear, and the cage. A driving input assembly is connected for driving rotation of the remaining two of the sun gear, the ring gear, and the cage to correspondingly rotate the remaining element connected to the driven output member.

The driving input assembly is appropriately driven by a driving input and includes a variable speed drive assembly for varying the relative rotational speeds of the remaining two of the sun gear, the ring gear, and the cage with respect to each other. The varying relative speed is chosen so that the driven output member is rotationally driven at a continuously variable speed within a predetermined speed range. Importantly, this rotational speed of the driven output member is adjustable without varying the speed of the driving input.

In one preferred embodiment of the invention, the driven output member comprises a driven shaft connected for rotation by the sun gear. The driving input includes a driving shaft connected for driving rotation of the cage. The variable speed drive assembly is coupled between the driving shaft and the ring gear, and comprises a pair of variable speed sheave asemblies for rotatably driving the ring gear in the same direction as the cage and at a rotational speed which varies relative to the rotational speed of the cage. When the cage and ring gear are driven at the same rotational speed, the sun gear is driven also at the same rotational speed. However, as the rotational speed of the ring gear is increased relative to the rotational speed of the cage, the ring gear forces the planet gear to rotate with increasing speed about its own axis in a direction to reduce gradually the rotational speed of the driven sun gear ultimately through zero and then with increasing speed in an opposite rotational direction.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is an enlarged fragmented vertical section taken on the line 3—3 of FIG. 2;

FIG. 4 is an enlarged fragmented horizontal section taken on the line 4—4 of FIG. 2;

FIG. 5 is a vertical section taken on the line 5—5 of FIG. 4;

FIG. 6 is a vertical section taken on the line 6—6 of FIG. 4;

FIG. 7 is an enlarged end view, partially in section, illustrating a portion of the transmission, with control circuitry therefor being illustrated in schematic form;

FIG. 8 is a fragmented vertical section taken on the line 8—8 of FIG. 4; and

FIG. 9 is a fragmented vertical section taken on the line 9—9 of FIG. 4.

DETAILED DESCRIPTION OF THE PREFERRED EMBODIMENT

Figure 1:
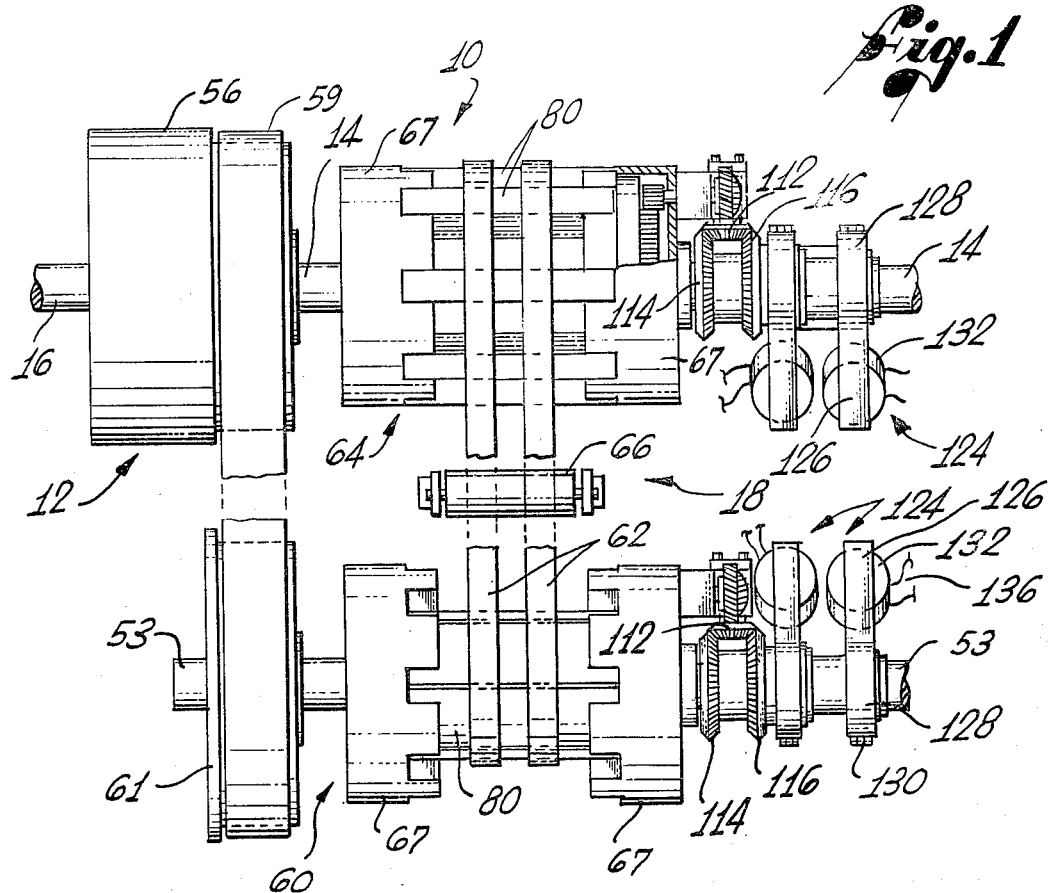
FIG. 1 is a fragmented plan view illustrating a rotary power transmission of this invention.
Figure 2:
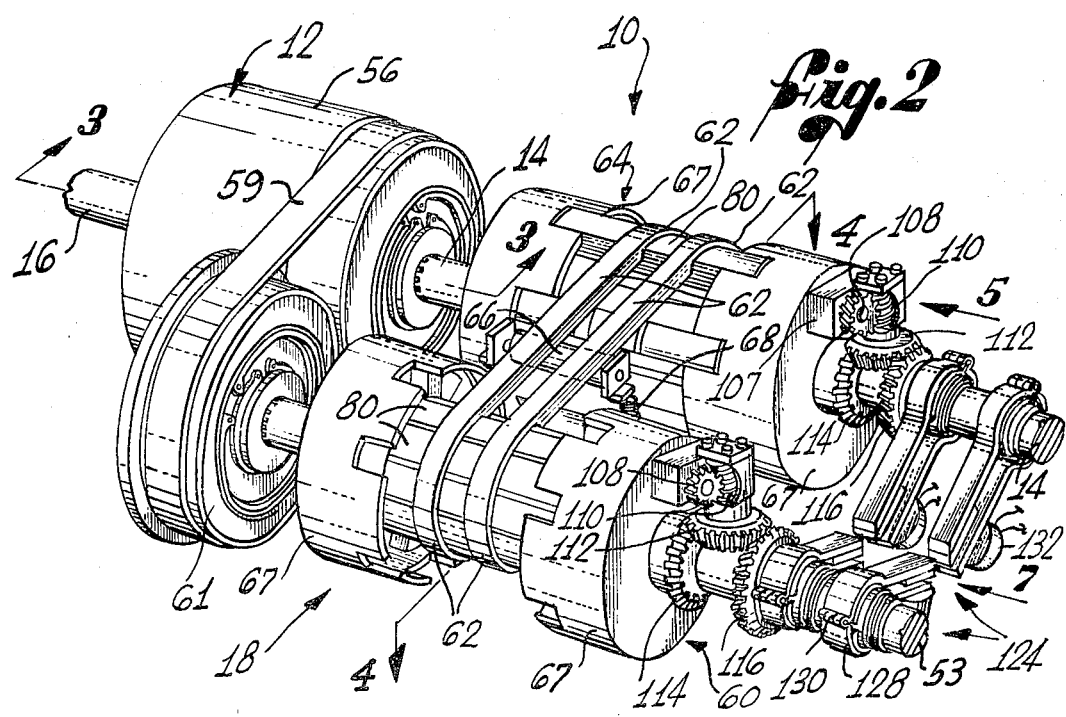
FIG. 2 is a fragmented perspective view illustrating the transmission of FIG. 1.

A rotary power transmission 10 of this invention is shown in FIGS. 1 and 2 and generally comprises a planetary gear train 12 connected between a driving input shaft 14 and a driven output shaft 16. A variable speed drive assembly 18 is driven by the driving input shaft 14 and is connected to the planetary gear train 12. As will be described in more detail, the driving input shaft 14 and the variable speed drive assembly 18 rotationally drive the planetary gear train 12 to drive the output shaft 16 at a speed which is continuously variable within a predetermined speed range. By appropriate connection of the driving shaft 14 and the variable speed sheave assembly 18 to the planetary gear train 12, the output shaft is rotatably driven at a speed which is continuously variable from a first speed in a first rotational direction through zero to a second speed in a second, opposite rotational direction.

The driving input shaft 14 may be suitably rotatably driven by any power source, such as an internal combustion engine or the like. Correspondingly, the driven output shaft 16 may be coupled to any of a wide variety of rotational loads depending upon the given application of the transmission 10. Since a large number of uses is contemplated for the mechanical power transmission of the type shown and described in this application, specific applications for the transmission are not discussed in detail.

The planetary gear train 12 is shown in detail in FIG. 3. As shown, the gear train 12 is enclosed in a housing 20 having an opening 22 for passage of one end of the driving input shaft 14. The shaft is supported for rotation with respect to the housing 20 by a bearing 24 and extends further into the housing interior for connection by a key 28 to a rotatable cage 26. The cage 26 forms an integral part of the planetary gear train 12 and is thus rotatably driven by the driving input shaft 14. Accordingly, in the embodiment illustrated, the cage 26 comprises the driving member of the planetary gear train 12 and rotates about a central axis 50 at the same speed and rotational direction as the driving input shaft 14.

The cage 26 carries a plurality of axially extending shafts 30 each supporting a planet gear 32. Each planet gear is rotationally received upon its associated shaft 30 for rotation about the axis of the shaft and is secured in position between a shaft shoulder 34 and a retaining ring 36. Importantly, the shafts 30 and their associated planet gears 32 are positioned for orbital motion about the central axis 50 upon rotation of the cage. While two planet gears 32 are shown in FIG. 3, it is to be understood that any number of such planet gears may be used. Where plural planet gears are used, it is desirable to arrange the gears as close as possible to equal angles with respect to each other about the central axis 50.

A sun gear 38 is secured by a key 40 on the driven output shaft 16 for rotation with the shaft 16. As shown in FIG. 3, the driven output shaft 16 has its end 42 supported within the cage 26 by a bearing 44, and the shaft 16 extends through the sun gear 38 and out of the housing 20 through a housing opening 46 including an additional bearing 48. Importantly, the driven shaft 16 and the sun gear 38 are also positioned for rotation about the central axis 50. In this manner, the sun gear 38 is positioned with its gear teeth 52 in meshing engagement with mating gear teeth 54 of the planet gears 32. Accordingly, orbital rotation of the planet gears 32 about the sun gear 38 causes interengagement between the sun gear teeth 52 and the planet gear teeth 54, whereby the sun gear 38 may be rotationally driven to provide a rotational output via the output shaft 16.

An annular ring gear 56 is received concentrically about the cage 26. This ring gear 56 is rotationally supported with respect to the cage by a bearing 58 for rotation about the common axis 50. The ring gear 56 includes radially inwardly presented gear teeth 55 aligned for matingly engaging the associated teeth 54 of the planet gear 32. In this manner, the sun gear 38, the ring gear 56, and the cage 26, including the planet gears 32, comprise the planetary gear train 12.

The ring gear 56 includes an outwardly presented circumferential groove 57 defining an annular recess for reception of a pulley belt 59. The pulley belt 59 is also reeved about a pulley 61 which is rotatably driven by the variable speed drive assembly 18. As illustrated in FIGS. 1 and 2, the variable speed drive assembly comprises an auxiliary shaft 53 carrying a variable diameter sheave assembly 60, and this sheave assembly 60 is drivingly coupled by a pair of drive belts 62 to another variable diameter sheave assembly 64 carried by the driving input shaft 14. Conveniently, an idler pulley 66 is biased by springs 68 in a direction to maintain the tension of the drive belts 62.

In operation, the sheave assembly 64 is rotatably driven by the driving input shaft 14 in the same rotational direction, and at the same rotational speed, as the cage 26 of the planetary gear train 12. This rotational motion is imparted to the other sheave assembly 60 via the drive belts 62 to drive the auxiliary shaft 53 in the same rotational direction. However, as will be described in more detail, the diameters of the sheave assemblies 64 and 60 are varied inversely to reduce or increase appropriately the rotational speed of the auxiliary shaft 53 to drive the ring gear 56 in the same rotational direction as the cage 26, but at a controlled rotational speed relative to the rotational speed of the cage 26.

The variable diameter sheave assemblies 64 and 60 are controlled to drivingly rotate the ring gear 56 through a range or rotational speeds relative to the rotational speed of the cage 26. Importantly, this results in a continuously variable rotational driven speed of the output shaft 16 without requiring variation of the rotational speed of the input shaft 14. Moreover, in the embodiment shown, the range of rotational speeds can be carefully chosen so that the direction of rotation of the output shaft 16 is reversible without uncoupling or declutching the input shaft 14 from the planetary gear train 12 and without disengaging any of the planetary gear train elements from each other. More specifically, when the sheave assemblies 64 and 60 are adjusted to rotate the ring gear 56 at the same rotational speed as the cage 26, there is no relative rotation between the ring gear and the cage whereby the ring gear teeth 55 lockingly engage the planet gear teeth 54. Such locking engagement of the gear teeth 55 and 54 prevents rotation of the planet gears 32 about their own axes to lock also the planet gear teeth 54 with the gear teeth 52 of the sun gear 38. Therefore, the sun gear 38 is driven in the same rotational direction and at the same rotational speed as the cage 26 and the ring gear 56.

Adjustment of the sheave assemblies 64 and 60 increase the rotational speed of the auxiliary shaft 53 with respect to the driving shaft 14 causes a corresponding increase in the rotational speed of the ring gear 56 relative to the cage 26. This relative rotation of the planet gears 32 about their own axes provides a component of rotation tending to drive the sun gear 38 in a rotational direction opposite the rotational direction of the cage 26 and the ring gear 56. The sun gear 38 is therefore rotationally driven by a first component of rotation imparted by the planet gears 32 rotating around their axes to urge the sun gear to rotate in an opposite relative rotational direction. As the rotational speed of the ring gear 56 progressively increases relative to the still-rotating cage 26, the driven sun gear 38 progressively slows and ultimately stops before beginning to rotate with increasing speed in an opposite rotational direction.

The variable speed drive assembly 18 including the variable diameter sheave assemblies 64 and 60 is shown in detail in FIGS. 4–9. As shown, the variable diameter sheave assemblies 64 and 60 each include a pair of facing housing members 67 including splines 70 meshed with mating splines 71 on the associated driving input shaft 14 and on the auxiliary shaft 53. Each assembly also includes a cylindrical sleeve 72 received about the associated shaft 14 and 53 and extending between the adjacent housing members 67 for relatively free rotation with respect to the shaft and housing members. The opposite ends of the sleeve 72 of each assembly are externally splined for engagement with internal splines of a pair of facing scroll members 74.

As shown in FIG. 6, each of these scroll members 74 is generally similar in construction to the scroll member of a conventional scroll chuck and includes an inwardly presented face 76 including a spiraled, or scrolled, recess 78. Importantly, the recesses 78 of the two scroll members 74 are spiraled in opposite directions. The recesses 78 of the two scroll members 74 of each sheave assembly 64 and 60 receive opposed end tabs 84 of a plurality of pulley segments 80 extending longitudinally between the scroll members 74. These pulley segments 80 include aligned belt-receiving cut-outs 82 generally centrally along their lengths for receiving the pair of flexible driving belts 62. Moreover, these pulley segments 80 are slidably received in radially open slots 88 formed in the adjacent opposed housing members 67 and have their end tabs 84 appropriately offset radially with respect to each other to ensure smooth running of the belts 62 about the axis of the associated shaft. In this manner, regardless of the relative radial positions of the pulley segments 80 with respect to the associated scroll members 74, the pulley segments 80 are drivingly received within the housing member slots 88 for rotation along with the housing members 67 and the associated shaft. Accordingly, the pulley segments 80 of the sheave assembly 64 are drivingly rotated by the driving input shaft 14 correspondingly to rotate the pulley segments 80 of the sheave assembly 60 on the auxiliary shaft 53.

As shown in FIG. 4, the auxiliary shaft 53 is conveniently supported for rotation within bearings 90 carried by a suitable transmission housing 94. The rotational motion of the auxiliary shaft is transmitted to the drive pulley 61 secured to the end of the shaft 53 as by a key 96. In this manner, the pulley 61 is rotated to drive the ring gear 56 via the pulley belt 59 in the same rotational direction as the cage 26. Conveniently, the end of the driving input shaft 14 opposite the planetary gear train 12 is also supported with respect to the transmission housing 94 as by a bearing 90, as viewed in FIG. 4.

One of the scroll members 74 of each of the sheave assemblies 64 and 60 is secured as by bolts 98 to a positional adjustment gear 100 including outwardly radiating gear teeth meshed with a relatively small spur gear 102. The spur gear 102 is mounted on one end of a stub shaft 104 which is rotatably carried within bearings 106 supported by a casing 107 fixed for rotation with the adjacent housing member 67. The opposite end of the stub shaft 104 is secured to a worm wheel gear 108 in meshing engagement with a radially extending worm pinion gear 110. The worm pinion gear 110 is rotatably driven by a bevel gear 112 in meshing engagement between a pair of upstanding differential gears 114 and 116. Each differential gear 114 is carried for rotation about the associated shaft 14 or 53 by a sleeve 118. This sleeve 118 is freely rotatable about the associated shaft and supports a second rotatable sleeve 120 which carries the other differential gear 116.

During normal operation of the variable speed drive assembly 18, the scroll member 74 of each sheave assembly 64 and 60 rotate with their respective shafts 14 and 53. The respective positional adjustment gears 100 rotate with the scroll members 74 and the housing members 67 to carry the bevel gear 112 rotationally therewith about the associated shaft. This causes the differential gears 114 and 116 to free-wheel with the bevel gear 112.

As shown in FIGS. 4 and 7, a plurality of brake assemblies 124 are provided for adjustably varying the diameters of the sheave assemblies 64 and 60. More specifically, a brake assembly 124 is provided in braking engagement with each one of the sleeves 118 and 120 on each of the shafts 14 and 53. These brake assemblies 124 each comprise a pair of generally parallel arms 126 extending toward the associated sleeve 118 or 120 and terminating in a pair of generally semi-circular shaped, opposed brake sections 128 received about the sleeve. The brake sections 128 include radially inwardly presented brake linings 129 extending about the associated sleeve, and the sections 128 are secured together opposite the arms 126 by a pivot pin 130. The parallel arms 126 of each of the brake assemblies 124 are movable toward and away from each other by individual solenoid-operated actuators 132 which are suitably coupled to a controller 134 as by conductive leads 136.

In operation, when it is desired to alter the diameters of the sheave assemblies 64 and 60, two of the brake assemblies 124 are operated appropriately by the actuators 132 to move their arms 126 toward each other to bring the linings 129 into braking engagement with the sleeve 118 of the sheave assembly 64 and with the sleeve 120 of the sheave assembly 60, or vice versa. In this manner, the bevel gears 112 of the two sheave assemblies 64 and 60 are rotated in opposite directions with respect to their axes to rotate correspondingly the respective worm pinion gears 110 in opposite directions. This causes opposite rotation of the respective spur gears 102 to rotate the pair of scroll members 74 of the two sheave assemblies 64 and 60 in opposite directions with respect to their associated housing members 67. Such rotation of the scroll members 74 serves to adjust the radial positions of the various pulley segments 80 whereby the effective diameters of the sheave assemblies 64 and 60 are varied inversely. Accordingly, the actuators 132 may be variably controlled to increase or decrease the drive ratio between the variable diameter sheave assemblies 64 and 60.

The invention of this application thus provides a rotary power transmission wherein an operator-controlled variable speed drive assembly 18 provides broad control of the rotary output of the transmission. More specifically, the varable speed drive assembly 18 is operated to provide a rotational output having a rotational speed which is continuous within a predetermined speed range without requiring adjustment of the speed of the driving input. Moreover the transmission is capable of providing a rotational output with a rotational speed variable continuously and smoothly between a given speed in one rotational direction through zero to a given speed in a second, opposite rotational direction. This output direction reversal is possible without reversing the direction of rotation of the driving input and without disengaging or declutching any components of the transmission.

A wide variety of modifications of the rotary drive transmission described herein are believed to be possible within the skill of the art. For example, it has been found that the driving input and the variable speed drive assembly 18 can be coupled to any two elements of the planetary gear train with the remaining element being coupled to the driven output. Where reversibility of the output is desired, and wherein the variable speed drive assembly 18 is coupled to rotate one of the planetary gear train elements in the same direction as the driving input, the invention may alternately include coupling of the driven output shaft to the ring gear 56 and coupling of the driving input shaft to either the sun gear 38 or to the cage 26. With this arrangement, the pulley belt 59 driven by the drive pulley 61 and the variable speed drive assembly 18 is connected to the remaining element of the planetary gear train to rotationally drive the remaining element in the same direction of rotation as the driving input shaft 14, but at a variable speed with respect thereto so as to enable reversal of rotational direction of the output shaft 16. Accordingly, no limitation of the invention is intended, except as set forth in the appended claims.

What is claimed is:

1. A variable speed rotary power transmission, comprising:
    a planetary gear train having a first gear, a second gear, and a cage all on a common axis, and at least one planet gear carried by said cage and meshed between said first and second gears for planetary motion about said axis;
    power output means connected for rotational driving by said first gear;
    power input means connected for rotatably driving in one direction one of said cage, and said second gear; and
    a variable speed drive assembly connected for rotatably driving the remaining one of said cage and said second gear in the same rotational direction as said power input means and through a range of rotational speeds such that said power output means is driven at a continuously variable speed ranging from a speed in a first rotational direction through zero to a speed in a second, opposite rotational direction;
    said variable speed drive assembly comprising a first variable diameter sheave assembly connected for rotational driving by said power input means, a second variable diameter sheave assembly connected for rotationally driving the remaining one of said cage and said second gear, belt means for transmitting rotational motion between said first and second sheave assemblies, and control means for varying the effective diameters of said first and second sheave assemblies generally inversely with respect to each other;
    each of said first and second sheave assemblies comprising a pair of facing rotatable housing members, a plurality of pulley segments extending longitudinally between said housing members and including means carried by said housing members for rotation therewith and radial sliding movement with respect thereto, a pair of facing scroll members disposed respectively adjacent the inboard faces of said housing members and rotatable together with respect to said housing members, said scroll members each having formed therein a spiraled recess presented toward the adjacent scroll member, said pulley segments each including tab means at opposite ends each received in the spiraled recess of the adjacent scroll member;
    each of said first and second sheave assemblies further including first gear means connected to one of said scroll members for rotation therewith, and second gear means meshed with said first gear means and rotationally carried with one of said housing members, said second gear means including a bevel gear rotatable with one of said housing members and orbital about the axis of rotation thereof, and first and second independently rotatable differential gears in meshing engagement with said bevel gear;
    said control means including means for effecting relative rotation between said first and second differential gears of said first and second sheave assemblies for rotating said bevel gears meshed therewith in rotational directions to correspondingly rotate said scroll members of said first and second sheave assemblies in generally opposite directions to inversely vary the radial positions of said pulley segments of said first and second sheave assemblies and thereby variably drive the remaining one of said cage and second gear through a range of rotational speeds.

2. The transmission as set forth in claim 1 wherein said power input means comprises a rotatable drive shaft, said first sheave assembly being mounted on said drive shaft for rotation therewith; and including a rotatable auxiliary shaft, said second sheave assembly being mounted on said auxiliary shaft for rotation therewith.

3. The transmission as set forth in claim 1 wherein said second sheave assembly is connected for drivingly rotating a drive pulley, and including a pulley belt drivingly connected between said drive pulley and the remaining one of said cage and said second gear.

4. The transmission as set forth in claim 1 wherein said first gear comprises a sun gear and said second gear comprises a ring gear.

5. The transmission as set forth in claim 4 wherein said power input means is connected for rotatably driving said cage, and said variable speed drive assembly is connected for rotatably driving said ring gear.

6. A variable speed rotary power transmission, comprising:
    a planetary gear train having a ring gear, a sun gear, and a cage all on a common axis, and at least one planet gear carried by said cage and meshed between said sun and ring gears for planetary motion about said axis;
    power output means connected for rotational driving by one of said sun gear and said ring gear;
    a drive shaft connected for rotatably driving in one direction one of said cage, and the other of said sun gear and said ring gear;
    a first variable diameter sheave assembly connected for rotatable driving by said drive shaft;
    a second variable diameter sheave assembly connected for rotatable driving of said remaining one of said cage, and the other of said sun gear and said ring gear in the same rotational direction as said drive shaft;
    each of said first and second sheave assemblies comprising a pair of facing rotatable housing members, a plurality of pulley segments extending longitudinally between said housing members and including means carried by said housing members for rotation therewith and radial sliding movement with respect thereto, a pair of facing scroll members disposed respectively adjacent the inboard faces of said housing members and rotatable together with respect to said housing members, said scroll members each having formed therein a spiraled recess presented toward the adjacent scroll member, said pulley segments each including tab means at opposite ends each received in the spiraled recess of the adjacent scroll member;

belt means carried about said pulley segments of said first and second sheave assemblies for transmitting rotational motion between said first and second sheave assemblies; and control means for generally inversely varying the effective diameters of said first and second sheave assemblies with respect to each other for effecting rotational driving of said remaining one of said cage and the other of said sun gear and said ring gear through a range of rotational speeds such that said power output means is driven at a continuously variable speed ranging from a speed in a first rotational direction through zero to a speed in a second, opposite rotational direction;

each of said first and second sheave assemblies further including first gear means connected to one of said scroll members for rotation therewith, and second gear means meshed with said first gear means and rotationally carried with one of said housing members, said second gear means including a bevel gear rotatable with one of said housing members and orbital about the axis of rotation thereof, and first and second independently rotatable differential gears in meshing engagement with said bevel gear;

said control means including means for effecting relative rotation between said first and second differential gears of said first and second sheave assemblies for rotating said bevel gears meshed therewith in rotational directions to correspondingly rotate said scroll members of said first and second sheave assemblies in generally opposite directions to inversely vary the radial positions of said pulley segments of said first and second sheave assemblies and thereby variably drive the remaining one of said cage and second gear through a range of rotational speeds.

7. A variable speed drive assembly, comprising:

a first variable diameter sheave assembly;

power input means including a first rotatable shaft coupled to said first sheave assembly for rotatably driving said first sheave assembly;

a second variable diameter sheave assembly;

power output means including a second rotatable shaft coupled to and rotatably driven by said second sheave assembly;

each of said first and second sheave assemblies comprising a pair of axially facing housing members mounted on the associated one of said first and second rotatable shafts for rotation therewith, a plurality of pulley segments extending longitudinally between said housing members and including means carried by said housing members for rotation therewith and radially sliding movement with respect thereto, a pair of axially facing scroll members on said associated one of said shafts and disposed respectively adjacent the inboard faces of said housing members and rotatable together with respect to said housing members, said scroll members each having formed therein a radially spiraled recess presented toward the adjacent scroll member, said pulley segments each including tab means at its opposite ends each received into the spiraled recess of the adjacent scroll member, first gear means connected to one of said pair of scroll members for rotation therewith, and second gear means meshed with said first gear means and rotationally carried with one of said housing members, said second gear means including a bevel gear orbital about said associated one of said shafts with rotation of said one of said housing members, a first differential gear in meshing engagement witn said bevel gear and carried by a first sleeve about said associated one of said shafts for free rotation with respect thereto, and a second differential gear in meshing rotation with said bevel gear and carried by a second sleeve about said associated one of said shafts for free rotation with respect thereto;

belt means carried about said pulley segments of said first and second sheave assemblies for transmitting rotational motion between said first and second sheave assemblies; and control means coupled to said first and second sheave assemblies for generally inversely varying the effective diameters of said sheave assemblies with respect to each other to vary the drive ratio between said sheave assemblies, said control means including means for effecting relative rotation between said first and second differential gears of said first and second sheave assemblies for rotating said bevel gears meshed therewith, whereby said bevel gears rotatably drive said first gear means meshed therewith for correspondingly rotating said scroll members of said first and second sheave assemblies generally in opposite directions to inversely vary the radial positions of said pulley segments of said first and second sheave assemblies.

8. The variable speed drive assembly as set forth in claim 7 wherein said means for effecting relative rotation between said first and second differential gears for each of said first and second sheave assemblies comprises a pair of braking assemblies engageable respectively with said first and second sleeves, and including means for selectively activating said braking assemblies to engage a selected one of said first and second sleeves to slow rotation thereof with respect to the associated shaft.

9. The variable speed drive assembly as set forth in claim 7 including a planetary gear train having a sun gear, a ring gear, and a cage all on a common axis, and at least one planet gear carried by said cage and meshed with said sun and ring gears for planetary motion about said axis, a driven shaft coupled for driving by one of said sun gear, said ring gear, and said cage, said power input means being coupled for rotatably driving another one of said sun gear, said ring gear, and said cage, and said second sheave assembly being coupled for rotational driving of the remaining one of said sun gear, said ring gear, and said cage such that said driven shaft is driven at a rotational speed which is continuously variable within a predetermined range for a given rotational speed of said power input means.

* * * * *